United States Patent [19]

Zimmermann et al.

[11] Patent Number: 5,115,066

[45] Date of Patent: May 19, 1992

[54] POLYSTYRENE HAVING HIGH DEGREE OF EXPANDABILITY, AND FORMULATION HAVING A HIGHLY-EXPANDABLE POLYMER THEREIN

[75] Inventors: Eugene K. Zimmermann, Hamilton Square; Bernhard Wagner, Cranbury; William E. Volz, Marlboro; William H. Harclerode, Ewing; John V. Wiman, Morristown; John C. Voss, Trenton, all of N.J.

[73] Assignee: BASF Corporation, Parsippany, N.J.

[21] Appl. No.: 777,869

[22] Filed: Oct. 15, 1991

Related U.S. Application Data

[62] Division of Ser. No. 617,711, Nov. 26, 1990.

[51] Int. Cl.$^5$ .................... C08F 12/02; C08F 112/02
[52] U.S. Cl. ........................ 526/346; 264/DIG. 7; 264/DIG. 9; 264/DIG. 10; 264/DIG. 15; 521/56; 521/58; 521/60; 521/142; 521/146; 521/149; 526/347; 526/347.1
[58] Field of Search ............... 526/346, 347, 347.1; 521/56, 58, 60, 142, 146, 149

[56] References Cited

U.S. PATENT DOCUMENTS

| | | | |
|---|---|---|---|
| 4,520,135 | 5/1985 | Hahn et al. | 521/56 |
| 4,525,484 | 6/1985 | Hahn et al. | 521/56 |
| 4,790,367 | 12/1988 | Moll et al. | 521/56 |

*Primary Examiner*—Morton Foelak
*Attorney, Agent, or Firm*—Dennis V. Carmen

[57] ABSTRACT

A polystyrene polymer as well as an expandable polystyrene formulation comprises a polystyrene polymer having a particular molecular weight distribution. The polymer itself exhibits a polydispersity of from about 1 to less tha 2.0, a weight average molecular weight of greater than about 200,000 to about 300,000, and an $M_z:M_n$ of from about 2 to less than about 3.0. Furthermore, the polystyrene polymer is branched to from 0 to less than 5 weight percent.

The expandable polystyrene formulation comprises a polystyrene polymer exhibiting a polydispersity of from about 1.0 to less than 2.5, a weight average molecular weight of from greater than about 180,000 to about 300,000, an $M_z:M_n$ of from about 2 to about 4.5. The polystyrene polymer is present in an amount of from about 94.5 weight percent to about 98 weight percent, based on the total weight of the formulation, and the polystyrene polymer is branched to from 0 to less than 5 weight percent. The formulation further comprises a blowing agent, wherein the blowing agent is present in an amount of from about 2 weight percent to less than 5.5 weight percent, wherein the blowing agent is a hydrocarbon which is gaseous or liquid at standard temperature and pressure, does not dissolve the styrene polymer, and boils below the softening point of the polymer.

14 Claims, No Drawings

POLYSTYRENE HAVING HIGH DEGREE OF EXPANDABILITY, AND FORMULATION HAVING A HIGHLY-EXPANDABLE POLYMER THEREIN

This is a division of application Ser. No. 07/617,711 filed Nov. 26, 1990.

BACKGROUND OF THE INVENTION

The present invention pertains to a polystyrene polymer exhibiting a new set of characteristics. These characteristics permit a high degree of expandability if the polymer is used in admixture with a blowing agent. The present invention also pertains to a formulation of the highly-expandable polymer in combination with a low level of blowing agent. The high degree of expandibility of the polymer of the present invention in turn permits the use of a low level of blowing agent therewith, resulting in the ability to utilize the formulation of the present invention in the production of an expanded polystyrene product of low density (e.g. 0.8 to 1.1 lb./cu.ft.) with blowing agent present in an amount of from just 2 to 5.5 weight percent, based upon the total weight of the formulation.

Typical commercial production of expanded polystyrene products has utilized only "one pass" expansion processes. ["One pass" prosesses are those which pre-expand styrene particulates only once before the molding operation.]These one-pass expansion processes required the use of a blowing agent in an amount of from about 5 weight percent to about 8 weight percent for the production of expanded polystyrene products having a density of from about 0.9 to about 1.1 lb./cu.ft.

In recent years volatile organic compound (VOC) air emissions have come under increasing scrutiny by the EPA, state, and local air quality boards as mandated by the Clean Air Act of 1977. Because hydrocarbon emissions have been shown to contribute to photochemical smog, the expanded polystyrene industry which uses pentane as a blowing agent has come under pressure to limit its use and/or emissions of pentane.

The inventors of the present invention unexpectedly discovered a highly-expandable polymer which they have characterized. The inventors also discovered a formulation (comprising the highly-expandable polymer in conjunction with a low level of blowing agent) which can be used to produce an expanded polystyrene product having a density of from about 0.8 lb./cu.ft. to about 1.1 lb./cu.ft. when the formulation (existing in the form of solid particles) is expanded in from 2 to 5 expansion steps (i.e. a "multipass" process). As a result, the polymer (and formulation utilizing same) provides the heretofore unavailable advantage of utilizing a very low level of blowing agent (most preferably about 3.5 weight percent, based on the total formulation weight) which thereby results in the release of a heretofore unachievable low level of blowing agent into the environment during the expansion process.

Since the early months of 1990, the inventors' polymer and formulation has enjoyed a high level of commercial success, with sales of at least 3 million pounds thereof, which formulation has the highly-expandable polymer present in an amount of about 96 weight percent, based on the total weight of product. Thus there has been a high level of commercial success of both the polymer as well as the formulation utilizing the polymer.

The inventors of the present invention are aware of several related art documents and products which are discussed below. First, U.S. Pat. No. 4,520,135 and a divisional application thereon (which issued as U.S. Pat. No. 4,525,484) describes a polystyrene particles containing blowing agent and having improved expandability based on polystyrene having a weight-average mean molecular weight of not more than from to 180,000 and a molecular weight distribution curve in which the high molecular weight side of the curve drops more steeply. These expandable polystyrene particles were produced by polymerizing styrene in aqueous suspension in the presence of blowing agents and of chain transfer agents or styrene oligomers.

In contrast to the '135 and '484 patents, the polymer of the present invention as well as the polymer within the formulation of the present invention have both: (1) a substantially lower polydispersity; as well as (2) a substantially higher weight average molecular weight, in comparison with the polymers described in the '135 and '484 patents. It has surprisingly been found that even though the weight average molecular weight of the polymer of the present invention is higher than the weight average molecular weight of the '135 and '484 patents, the polymer of the present invention has a very desirable high degree of expandability and moldability.

Other related documents include: U.S. Pat. No. 2,884,386; U.S. Pat. No. 4,839,396; U.S. Pat. No. 4,485,193; U.S. Pat. No. 3,639,551; U.S. Pat. No. 3,631,133; U.S. Pat. No. 3,589,769, U.S. Pat. No. 3,126,432, U.S. Pat. No. 3,056,753; and U.S. Pat. No. 4,721,588. None of these patents warrants any detailed discussion since none discloses subject matter which is very close to the polymer and formulation of the present invention.

For several years BASF Corporation has been involved in the manufacture and sale of a number of expandable polystyrene formulations having approximately 6 weight percent pentane therein. Typically these formulations contained a polymer having a polydispersity of 2.2, a weight average molecular weight of about 190,000, and an $M_z:M_n$ of about 3.5. In stark contrast, the product of the present invention has a polydispersity of from 1 to less than 2, a weight average molecular weight of from about 200,000 to about 300,000, and an $M_z:M_n$ of from about 2 to less than 3.

One polymer which has been commercialized for several years has a polydispersity of about 1.9, a weight average molecular weight of about 190,000, and furthermore, upon analysis, yielded an $M_z:M_n$ of 3.04. Furthermore, this polymer was produced only in formulations bearing blowing agent in an amount of about 6 weight percent. In contrast, the polymer of the present invention has a combination of characteristics (polydispersity, weight average molecular weight, and $M_z:M_n$), which differs from the aforementioned commercially available polymer. Furthermore, the formulation of the present invention utilizes blowing agent in an amount of only from about 2 weight percent to about 5.5 weight percent.

BRIEF SUMMARY OF THE INVENTION

The present invention relates to a polystyrene polymer exhibiting (i.e. having) three characteristics. First, the polystyrene polymer exhibits a polydispersity of from about 1 to less than 2.0. Second, the polystyrene polymer also exhibits a weight average molecular weight of from greater than about 200,000 to about 300,000. Third, the polystyrene polymer exhibits an $M_z:M_n$ of from about 2 to less than about 3.0. It is believed that these three criteria are so descriptive of the polymer that together they define only that particular polymer which the inventors have invented. Furthermore, the Comparative Examples herein should be noted as providing data regarding several commercial processes, and it should be particularly noted that among all of these polystyrene polymers, there is none which has all of the characteristics of the polymer of the present invention.

The present invention also relates to an expandable polystyrene formulation. This formulation comprises both a polystyrene polymer as well as a blowing agent. The polystyrene polymer (in the formulation) exhibits three characteristics and the blowing agent is present at a level (of from about 2 weight percent to about 5.5 weight percent, based on the total weight of the formulation) which has heretofore not been commercially feasible. The first characteristic of this polystyrene polymer (present in the formulation) is a polydispersity of from about 1.0 to less than 2.5. The second characteristic of this polystyrene polymer is a weight average molecular weight of from greater than about 180,000 to about 300,000. The third characteristic of this polystyrene polymer is an $M_z:M_n$ of from about 2 to about 4.5. Furthermore, this polystyrene polymer is present (in the formulation) in an amount of from about 94.5 weight percent to about 98 weight percent, based on the total weight of the formulation.

It is an object of the present invention to provide a polystyrene polymer having a high degree of expandability.

It is a further object of the present invention to provide a an expandable polystyrene formulation which may be used to produce expanded polystyrene products.

It is a further object of the present invention to provide a an expandable polystyrene formulation which may be used to produce expanded polystyrene products while using less blowing agent in comparison with prior commercial processes for making expandable pblystyrene products.

It is a further object of the present invention to provide an expandable polystyrene formulation which incorporates therein a polystyrene polymer having a high degree of expandability.

It is a further object of the present invention to provide both a polystyrene polymer and an expandable polystyrene formulation which can be used to make expanded polystyrene products via processes having decreased emissions of volatile organic compounds during storage, preexpansion, postexpansion (but premolding) ageing, and processing.

It is a further object of the present invention to provide both a polystyrene polymer as well as an expandable polystyrene formulation which permit processes for making expanded polystyrene products in which a decreased amount of blowing agent is used.

It is a further object of the present invention to provide a polystyrene polymer as well as an expandable polystyrene formulation which can be utilized in expansion processes in which there is less blowing agent emitted either to the environment or to pollution abatement equipment.

It is a further object of the present invention to provide an expandable polystyrene formulation permitting a greater ratio of resin to blowing agent, so that more resin is present per pound of formulation.

It is a further object of the present invention to enable the production of expanded polystyrene products using decreased molding cycle times, as well as decreased shrinkage upon molding, as well as decreased aging times between expansion steps.

It is a further object of the present invention to enable the production of an expanded polystyrene product having decreased susceptibility to damage during processing.

It is a further object of the present invention to enable the production of an expanded polystyrene beads having increased shelf life before the molding step due to a lower rate of loss of blowing agent therefrom.

It is a further object of the present invention to enable a process for making expanded polystyrene products in which there is decreased sensitivity to steam during the expansion and molding steps, thereby permitting a "broader molding range" process with respect to the use of steam in the preexpansion and molding steps.

It is further object of the present invention to provide a formulation which incorporates therein a polystyrene polymer which when preexpanded has a high degree of moldability.

Each of the above objects can further be understood as providing a respective advantage to the polymer and/or formulation of the present invention.

DETAILED DESCRIPTION OF THE PREFERRED EMBODIMENTS

The polystyrene polymer of the present invention exhibits three characteristics: (1) a polydispersity within a given range; (2) a weight average molecular weight within a given range; and (3) an $M_z:M_n$ within a given range. Furthermore, both the polymer and the formulation of the present invention are herein defined in terms of weight average molecular weight ($M_w$), number average molecular weight ($M_n$), "z-average" molecular weight ($M_z$). The number average molecular weight is the arithmetic mean value obtained by diving the sum of the molecular weight by the number of molecules. The weight average molecular weight is the second power average molecular weight in the polydisperse polymer. The z-average molecular weight molecular weight is the third power average molecular weight in the polydisperse polymer. More extensive and descriptive definitions of these various molecular weights were described by Billmeyer, F. W., Jr., *Textbook of Polymer Science*, 2nd Ed., 1971, Wiley-Interscience, N.Y., N.Y., pp 6, 66, 78, 92.

Polystyrene particles produced according to the invention differ (at a minimum) from those of the prior art with respect of their molecular weight and their molecular weight distribution, as is determined using the above-described parameters. The molecular weight distribution curve is determined by gel permeation chromatography. This method is described in detail in G. Glockler, Polymercharakterisierung, Chromatographische Methoden, volume 17, published by Huthig, Heidelberg 1982.

The first of these characteristics, i.e. polydispersity, is determined by analyzing the molecular weight distribution curve for the reaction product of the polymerization. Polydispersity is calculated by dividing the weight average molecular weight by the number average molecular weight. Thus, polydispersity (PD) is a measure of the breadth of the polymer molecular weight distribution. The polystyrene polymer of the present invention generally exhibits a polydispersity of from about 1 to less than 2.0. Preferably, the polystyrene polymer of the present invention exhibits a polydispersity of from about 1.5 to less than about 2, and most preferably the polystyrene polymer of the present invention exhibits a polydispersity of from about 1.7 to about 1.98. Example 7 (e.g. see the Description of Analytic Procedure, infra) describes the method of analysis of the polymeric reaction product, this method providing the means for determination of weight average molecular weight, number average molecular weight, and z-average molecular weight. Thus this analytical procedure provides the data from which one may then calculate polydispersity, weight average molecular weight, and the $M_z:M_n$ ratio.

The second characteristic which the polystyrene polymer exhibits (i.e. the weight average molecular weight) is, in general, from greater than about 200,000 to about 300,000. Preferably, the polystyrene polymer of the present invention has a weight average molecular weight of from greater than 200,000 to about 250,000. Most preferably, the polystyrene polymer of the present invention has a weight average molecular weight of from greater than 200,000 to about 220,000. As with polydispersity, the weight average molecular is determined by the analysis provided in Example 7, infra.

The third characteristic is the ratio of $M_z:M_n$. This ratio is related to the steepness of slope of the upper end of the molecular distribution curve. In general, the polystyrene polymer of the present invention exhibits an $M_z:M_n$ ratio of from about to 2 to less than 3.0. Preferably, the polystyrene polymer of the present invention exhibits an $M_z:M_n$ ratio of from about 2.5 to less than 3.0, and most preferably the polystyrene polymer exhibit an $M_z:M_n$ ratio of from about 2.7 to less than 3.0. As with polysidpersity and weight average molecular weight, the $M_z:M_n$ ratio can be calculated based upon the analytic results obtained from the procedure of Example 7. This procedure, of course, results in obtaining a molecular weight distribution curve. The value for weight average molecular weight, number average molecular weight, and "z-average molecular weight" can be determined. These values permit the calculation of polydispersity as well as $M_z:M_n$ ratio.

The polystyrene polymer of the present invention is a substantially linear polymer, i.e. is a substantially unbranched polymer. In general the polystyrene polymer of the present invention has a degree of branching of from 0 to less than 5 weight percent. The phrase ". . . branched to from 0 to less than 5 weight percent . . ." is herein defined as referring to a polymeric chain in which at least 95 percent of the molecular weight of the polymer resides in that portion of the molecule which constitutes the linear chain. For purposes of calculating the weight percent of the polymer which resides in branches (as opposed to the linear portion of the polymer molecule), carbon atoms which are not part of the main polymeric chain are considered to be located on branches, and any atoms which are attached to the branch carbon atoms are likewise considered to be located on the branch portion of the polymer molecule. Non-carbon atoms which are bonded to a carbon atom of the linear polymer backbone are considered substituents, rather than branches. However, if a substituent atom is bonded directly or indirectly to a second carbon atom wherein the second carbon atom is not part of the linear polymer backbone, the substituent as well as any atoms attached thereto (which are not part of the polymer backbone) are considered to be a branch. The polystyrene polymer of the present invention is preferably branched to from 0 to less than 2 weight percent. Most preferably the polystyrene polymer of the present invention is branched to from 0 to less than 1 weight percent.

The polystyrene of the present invention is preferably a substantially homopolymeric polystyrene polymer. That is, the polystyrene polymer of the present invention is preferably derived for a single monomer, that monomer being styrene. The phrase "substantially homopolymeric polystyrene polymer" is herein defined as a polymer in which at least 99 percent of the monomeric units (which reacted to form the polystyrene) were styrene. Preferably, at least 99.9 percent of the monomeric units which are reacted to form the polystyrene polymer are styrene monomers.

Preferably the polystyrene polymer of the present invention is a substantially unsubstituted polystyrene polymer. The phrase "substantially unsubstituted polystyrene polymer" is herein defined as a polystyrene polymer having a carbon backbone and branches in which less than 2 percent of the available sites for substitution have atoms other than hydrogen thereon. Still more preferably, the degree of substitution is less than 0.5 percent, based on the total number of positions for substitution available on the polymer.

A preferred polystyrene polymer of the present invention exhibits: (1) a polydispersity of from about 1.5 to less than 2.0; (2) a weight average molecular weight of from greater than to about 200,000 to about 250,000; and (3) an $M_z:M_n$ of from about to 2.5 to less than about 3.0. Furthermore, this preferred polystyrene polymer is branched to from 0 to less than 2 weight percent. Finally, this preferred polystyrene polymer is a substantially homopolymeric, unsubstituted polystyrene polymer.

A still more preferred polystyrene polymer of the present invention exhibits: (1) a polydispersity of from about 1.7 to about 1.98; (2) a weight average molecular weight of greater than about 200,000 to about 220,000; and (3) an $M_z:M_n$ of from about 2.7 to less than about 3.0. Furthermore, this still more preferred polystyrene polymer is branched to from 0 to less than 1 weight percent. Finally, this still more preferred polystyrene polymer is a substantially homopolymeric, unsubstituted polystyrene polymer.

The present invention also relates to an expandable polystyrene formulation, i.e. a formulation from which expanded polystyrene products can be produced. In general, this formulation comprises both a specific polystyrene polymer as well as a blowing agent, wherein the blowing agent is present at a relatively low level. The polystyrene polymer utilized in the formulation of the present invention is herein defined with respect to three characteristics: polydispersity, weight average molecular weight, and $M_2:M_n$, wherein the polystyrene polymer is branched to from 0 to less than 5 weight percent. Each of the above three characteristics are discussed in more detailed below.

The polydispersity of polystyrene polymer utilized in the formulation is, in general, a polydispersity of from about 1.0 to less than 2.5. Preferably the polydispersity of the polymer is from about 1.0 to less than 2.0, and still more preferably the polydispersity is from about 1.5 to less than 2.0, and most preferably the polydispersity is from about 1.7 to about 1.98. The term polydispersity, as used regarding the formulation of the present invention, has the same general meaning described above (i.e. with respect to the polymer of the present invention), and the same general analytical methods of determination apply thereto (as described above with respect to the polymer of the present invention).

In general the weight average molecular weight of the polystyrene polymer within the formulation of the present invention is a molecular weight of from greater than about 180,000 to about 300,000. Preferably the polymer in the formulation has a weight average molecular weight of from greater than about 190,000 to about 250,000. Most preferably, the polystyrene polymer within the formulation has a weight average molecular weight of from about 200,000 to about 220,000. As stated above, the weight average molecular weight is determined via the analysis described in Example 7.

In general, the polystyrene polymer in the formulation of the present invention exhibits a $M_z:M_n$ ratio of from about 2 to about 4.5, preferably from about 2.5 to about 3.3. Most preferably, the polystyrene polymer exhibits an $M_z:M_n$ ratio of from about 2.7 to about 3.0.

In general, the polystyrene polymer in the formulation of the present invention is present in an amount of from about 94.5 weight percent to about 98 weight percent based on the total weight of formulation. Preferably the polystyrene polymer is present in an amount of from about 94.6 to about 97.5 weight percent, and most preferably the polystyrene polymer is present in an amount of about 96 weight percent, based on the total weight of the formulation.

In general, the polystyrene polymer in the formulation of the present invention is branched to from 0 to less than 5 weight percent. Preferably the polymer is branched to from 0 to about 2 weight percent, and most preferably the polymer is branched to from 0 to about 1 weight percent. Example 18 (infra) describes how to determine the degree of branching of a polymer.

The polystyrene polymer in the formulation of the present invention is preferably a substantially homopolymeric polymer. Furthermore, the polystyrene polymer in the formulation of the present invention is preferably a substantially unsubstituted polystyrene polymer. With respect to the polymer utilized in the formulation of the present invention, the phrases "substantially homopolymeric" and "substantially unsubstituted" have the definitions provided hereinabove with respect to the polymer of the present invention.

The expandable polystyrene formulation of the present invention further comprises a blowing agent. In general the blowing agent is present in the formulation in an amount of from about 2 weight percent to about 5.5 weight percent, based on the weight of the total formulation. Preferable, however, the blowing agent is present in the formulation in an amount of from about 2.5 weight percent to about 4.4 weight percent, based on the total weight of the formulation. Still more preferably, the blowing agent is present in the formulation in an amount of from about 3 weight percent to about 4 weight percent, based on the total weight of the formulation. Most preferably, the blowing agent is present in the formulation in an amount of about 3.5 weight percent, based on the total weight of the formulation.

Any one or more of a wide variety of blowing agents can be utilized in the formulation of the present invention. In general, these blowing agents are hydrocarbons which are gaseous or liquid under normal conditions, do not dissolve the styrene polymer, and boil below the soften point of the polymer. In general, blowing agents which can be used in the formulation of the present invention comprise at least one member selected form the group consisting of:

pentane, cyclopentane, neopentane, isopentane, pentane petroleum distillate fractions, propane, butane, isobutane, hexane, 2,2-dimethylbutane, 2,3-dimethylbutane, 2-methyl pentane, 3-methyl pentane, methylcyclopentane, cyclohexane, methylcyclohexane, heptane, propylene, butylene, isobutylene, mixtures of one or more aliphatic hydrocarbons having a molecular weight of at least 42 and a boiling point not higher than 95° C. at 760 millimeters absolute pressure, water, carbon dioxide, ammonium carbonate, and azo compounds that are decomposable to form a gas at a heat-plastifying temperature to which the polymer is brought.

Preferably the blowing agent in the formulation of the present invention is at least one member selected from the group consisting of:

pentane, cyclopentane, neopentane, isopentane, pentane petroleum distillate fractions, propane, butane, isobutane, hexane, 2-methyl pentane, 3-methyl pentane, methylcyclopentane, cyclohexane, heptane, propylene, butylene, water, carbon dioxide, ammonium carbonate, and mixtures of aliphatic hydrocarbons having a molecular weight of at least 42 and a boiling point not higher than 95° C. at 760 millimeters absolute pressure.

Still more preferably the blowing agent to be utilized in the formulation of the present invention is at least one member selected from the group consisting of:

cyclopentane, neopentane, isopentane, pentane petroleum distillate fractions, propane, butane, isobutane, hexane, 2-methyl pentane, 3-methyl pentane, methylcyclopentane, cyclohexane, heptane, propylene, 1-butylene, 2-butylene, and mixtures of at least two aliphatic hydrocarbons having a molecular weight of at least 42 and a boiling point of not higher than 95° C. at 760 millimeters absolute pressure.

The blowing agent utilized in the formulation of the present invention is still more preferably at least one member selected from the group consisting of:

pentane, cyclopentane, neopentane, isopentane, pentane petroleum distillate fractions, propane, butane, isobutane, hexane, cyclohexane, heptane, and methylcyclopentane.

Most preferably the blowing agent is at least one member selected from the group consisting of n-pentane and isomers thereof.

Preferably the formulation of the present invention further comprises a chain transfer agent. Chain transfer agents having a transfer constant (as defined in Vollmert, Grundriss der Makromolekularen Chemie, published by Springer 1962, pages 52 and 71, which is hereby incorporated by reference) of from 0.1 to 50, preferably from 1 to 30, are used. Examples of suitable chain transfer agents are:

| | |
|---|---|
| n-Dodecyl mercaptan | (K = 19) |
| tert.-Dodecyl mercaptan | (K = 3) |
| n-Butyl mercaptan | (K = 22) |
| tert.-Butyl mercaptan | (K = 3.6) |
| Carbon tetrabromide | (K = 2.2) |
| Pentaphenylethane | (K = 2.0) |

Preferably but optionally the formulation of the present invention further comprises a flame retardant. In general, the flame retardant is an organic bromine or chlorine flame retardant compound present in an amount of from about 0.2 to about 2 weight percent, based on the weight of the total formulation. More preferably the formulation comprises a brominated hydrocarbon flame retardant in an amount fo from about 0.5 to about 1.5 weight percent, based on the weight of the total formulation. Still more preferably the formulation comprises a flame retardant which is at least one member selected from the group consisting of trisdibromo-propylphosphate, hexabromocyclododecane and bis allyl ether of tetrabromo-bis-phenol A, wherein the flame retardant is present in an amount of from about 0.6 to about 1.2 weight percent, based on the total weight of the formulation.

Preferably but optionally the formulation of the present invention further comprises a "flame retardant synergist", i.e. one or more compounds which increase the effectiveness of the flame retardant when used in combination therewith. The flame retardant synergist may at least one member selected from the group consisting of dicumyl peroxide and other organic peroxides which have a half-life of 1 hour at temperatures of from about 110° C. to about 150° C.

The polystyrene particles can also contain other additives which impart particular properties to the expandable products, such as, antistatic agents, stabilizers, colorants, lubricants, fillers, substances which prevent agglomeration during prefoaming, e.g. zinc stearate, melamine-formaldehyde condensates or silica, and agents for reducing the demolding time during final foaming, e.g. glycerol esters or hydroxycarboxylic acid esters. Depending on their intended effect, the additives may be homogeneously dispersed in the particles or be present as a surface coating.

EXAMPLE 1

Method of Making Polymer

A mixture of 87 parts of water, 0.16 parts of sodium pyrophosphate, and 0.27 parts of magnesiun sulfate heptahydrate was reacted with stirring at ambient temperature in a stainless steel pressure resistant vessel. To this mixture was added a mixture of 100 parts of styrene, 0.14 parts of benzoyl peroxide, 0.32 parts t-butylperbenzoate, 0.62 parts of hexabromocyclododeane, and 0.21 parts of dicumyl peroxide, with stirring. The vessel was heated for at least 2 hours at a constant rate to 85° C. and then to 115° C. over 4.5 hours. Sixty-five to seventy-five minutes after the vessel reached 80° C., 2.9 parts of a 10% aqueous solution of poly-n-vinylpyrrolidone was added to the reaction mixture. After an additional 100-120 minutes, a solution of 0.10 parts of chain transfer agent in 4.7 parts of n-pentane was added to the reaction vessel. After reaching 115° C., the vessel was held at constant temperature for 3 hours, whereupon it was cooled to ambient temperature over 3 hours.

EXAMPLE 2

A polystyrene polymer was prepared substantially as described in Example 1. The polymer contained approximately 3.1 percent pentane (blowing agent). The resulting expandable polystyrene beads were analyzed according to the procedure of Example 7, and were found to have contained polymer having a polydispersity of 1.82, a weight average molecular weight of 202,000, and an Mz:Mn of 2.70. The beads were screened to 0.6-1.3 mm diameter, dried to remove surface moisture, and coated with 0.12 weight percent of a mixture of powdered lubricants and antilumping agents commonly used in the industry as screening aids and antilumping agents. The pentane content of the beads out of the polymerization reactor was 3.41 weight percent. However, as was typical, about 0.3 weight percent of pentane was lost during subsequent processing, making 3.1 weight percent the approximate pentane content at the time of expansion.

The coated beads were expanded in a Tri Manufacturing Model 502 expander. The inlet steam temperature was about 211° F., and the inlet steam flow rate was approximately 74 pounds per hour. The first-pass expansion rate was about 208 pounds per hour and the outlet density of the prepuff was about 1.9 pounds per cubic foot. A fluidized bed drier (as commonly used in the industry) was utilized to cool and partially stabilize the resulting prepuff. The fluidized bed dryer was equipped with a blower which fluidized a protion of the beads with ambient air. The prepuff was then pneumatically conveyed to storage bags and aged at ambient temperature and humidity for about 3 hours. Following aging, the prepuff was expanded again in the same expander operated at the same conditions, the result being a prepuff having a density of about 1.10 lb/cu.ft., the expander operating at a throughput of about 217 pounds per hour. The resulting prepuff was again passed through the fluidized bed dryer. After airveying again to storage bags and aging for about three hours, the prepuff was transferred to a Kurtz vacuum block mold (4'×8'×34") and molded. The molding cycle consisted of presteaming vacuum to about 0.5 bar absolute pressure, followed by cross-steaming and autoclaving with steam. The resulting block was then cooled with vacuum until the foam pressure was stabilized. The pressure release time was about 30 seconds, and the resultant block had an average of 10% fusion, 1% shrinkage (defined as actual block length shrinkage 24 hours after molding compared to actual mold length), 1.6% collapse (defined as actual thickness shrinkage in middle of block compared to actual mold thickness), and a bulk density of 1.10 lb/cu.ft. (defined as weight of block divided by actual mold volume).

EXAMPLE 3

This example illustrates the expansion and molding of relatively large polystyrene beads containing 4.4 weight percent pentane. The effect of insufficient aging time prior to molding is herein demonstrated. In addition, a comparison is given with respect to materials containing conventional amounts of pentane.

An expandable polystyrene bead product containing an average of 4.40 weight percent pentane and a bead diameter of 1.3-1.9 mm was expanded in a Kurtz KV1000 expander equipped with a Kurtz automatic density control system which adjusted inlet steam flow to achieve desired prepuff outlet density. A fluidized-bed dryer was utilized for both expansions. The first-pass expansion was at a rate of 2,000 lbs/hr and a density of 1.22-1.25 lb/cu.ft. After about two hours age, the prepuff was expanded again, at a rate of 3,000 lbs/hr to a density of 0.88-0.90 lb/cu.ft. The prepuff was then molded on a Kurtz vacuum block mold (26"×49.5"×196"). No pre-steam vacuum was used. Steam was added at a pressure of about 0.6 bar for about 6 seconds cross-steam followed by about 10 seconds autoclave. Vacuum was used to cool the block in the mold. After only one hour prepuff aging, the blocks were of poor quality, i.e. poorly fused and deformed (poor dimensional stability). After 3-4 hours prepuff aging, the blocks were molded to 0.7 bar maximum foam pressure and were of excellent quality with a total cycle time of 160-170 seconds. Typical cycle times with normal pentane product after 24-36 hours aging were 300-360 seconds.

EXAMPLE 4

This example illustrates how the use of a 4.4% pentane formulation compares favorably with respect to the use of a conventional formulation. Expansion and molding results, cycle time, fusion, and dimensional stability were acheived with the 4.4% pentane formulation over a conventional 6% pentane formulation.

An expandable polystyrene bead product containing an average of 4.40% pentane and a bead diameter of 0.6-1.3 mm was expanded in a Weiser VN400 expander equipped with a fluidized-bed dryer. The first-pass rate was about 2,600 lb/hr at an outlet density of about 1.20 lb/cu.ft. After aging for about four hours, the prepuff was expanded again, at a rate of about 4,000 lb/hr and at an outlet density of about 0.79-0.88 lb/cu.ft. After about one hour of aging, the prepuff was molded in a Weiser VacuCompact block mold (196"×49"×31"). Cycle times, fusion, and dimensional stability were equal to or better than that of products of normal (6%) pentane content which had been aged overnight (i.e. over eight hours of aging).

EXAMPLE 5

This example illustrates, among other results, the advantageous performance of a formulation comprising 3.6% pentane. Note the highly desirable low aging time as well as the desirable molding cycle time with accompanying high dimensional stability after molding.

An expandable polystyrene bead product containing an average of 3.58% pentane and a bead diameter of from 0.6-1.3 mm was expanded in a Weiser VN400 expander equipped with fluidized bed drying. The first-pass expansion rate was about 3,100 lb/hr at an outlet density of about 1.59 lb/cu.ft. After aging about four hours, the prepuff was expanded again, at a rate of about 3,400 lb/h and outlet density of about 0.84-0.86 lb/cu.ft. After about one hour age, the prepuff was molded on a Weiser VacuCompact block mold. Pressure-release (i.e., cooling) time was only 29 seconds. All blocks were well fused and dimensionally stable.

EXAMPLE 6

This example illustrates, among other advantages, how a formulation comprising 3.63 percent pentane permits a highly advantageous molding cycle time, with accompanying 50% increase in productivity in the molding step, due to the lower molding cycle time. Good fusion and dimensional stability are also shown.

An expandable polystyrene bead product containing an average of 3.63% pentane and a bead diameter of from 0.6-1.3 mm was expanded in a Dingledein & Herbert VA-K2000 expander. The first-pass expansion rate was 3,000 lb/hr at an outlet density of 1.66-1.75 lb/cu.ft. After aging for about 24 hours, the prepuff was expanded again, at a rate of about 4,000 lb/hr and an outlet density of about 0.92-0.94 lb/cu.ft. After aging for about two hours, the prepuff was molded in a 16' Tri Manufacturing block mold. Well-fused, dimensionally stable blocks were produced at a rate of about 15 blocks per hour, as compared to 10 blocks per hour for normal pentane-content beads.

EXAMPLE 7

Molecular Weight Distribution Curve Determination

The following equipment and procedure was utilized in order to generate the molecular weight distribution curve for polystyrene polymers. This procedure was utilized to both determine the molecular weight distribution of the polystyrene polymer of the present invention, as well as to analyze products which are herein compared and contrasted with the polymer and formulation of the present invention.

Chromatography Equipment and Conditions

The apparatus consisted of a Waters 6000A pump with a U6K injector, a Viscotek-supplied pulse dampener, two 30 cm PLGel 5 um Mixed Bed polystyrene columns, a Viscotek Model 100 differential visometer (DV) and a Waters R401 differential refractometer (RI). The data acquisition and analysis hardware consisted of an IBM PC AT equipped wit 640 kb RAM, a 30 Mb fixed disk and two 5.25" floppy disk drives; a dot matrix printer and an HP 7475A plotter. The software used was Unical Ver. 3.11 (an ASYST-based package) modified to display $M_{z+1}$ and obtained from Viscotek. The chromatographic conditions were as follows:

| | |
|---|---|
| Nominal flow rate: | 1.0 ml/min |
| Solvent: | THF, high purity, non-spectro grade |
| sample Injection Volume: | 0.100 ml |
| RI Detector: | Attenuation: 16x |
| Polarity: | + |
| DV Detector: | Temperature: $31.0 \pm 0.1°$ C. |
| Full Scale Output: | 50 Pa |
| DPT Sensitivity: | 0.2074 |
| Data Acquisition: | Start Time: 6 min. |
| Stop Time: | 24 min. |

Analytical Procedure

The THF to be used as the mobile phase for the GPC system was filtered through a 0.45 um fritted filter and then degassed under an aspirator vacuum for approximately 45 minutes. The THF and the flask were then transferred to the GPC system and the THF maintained under a pad of helium. Samples were made up to a concentration of 5 mg/ml and filtered through a Gelman Acrodisc CR PTEE 0.45 um filter prior to injection.

Only freshly prepared solutions were used as polymer degradation was apparent with aged solutions. All solutions were analyzed twice. The EPS (expanded polystyrene) samples were not purified by precipitation prior to dissolution and analysis, as comparison of purified and raw EPS polymer results indicated no significant differences. To obtain accurate solution concentrations for the unprecipitated EPS, the initial solution concentrations were corrected for volatiles determined by GC and coulombmetric analysis for pentane and moisture, respectively, or gravimetrically by baking a sample for total volatiles.

To correct for fluctuations in flow rate, each chromatogram was normalized to the flow rate present during calibration. This was accomplished by calculating the ratio of the void volumes (total exclusion volume, earliest negative peak in chromatogram) of the calibration chromatograms to the sample chromatogram. The calibration void volume was determined to be 19.72 ml.

The ratio was then entered into the data analysis package as the corrected flow rate.

EXAMPLES 8-15

The procedure of Example was substantially followed in making a polystyrene formulation according to the present invention. This polymer formulation is identified as Example 8 in Table I (infra). The polymer formulation of Example 9 contained a blowing agent (pentane) in an amount of about 3.5 weight percent. The polymer of Example 9 was analyzed according to the procedure set forth in Example 7, and from this analysis the number average molecular weight (Mn), the weight average molecular weight (Mw), and the z-average molecular weight ($M_z$) were determined. From these values the polydispersity (PD) and the Mz:Mn were calculated.

The analytical procedure of Example 7 was also performed for several current commercial products (i.e. Examples 9-14), each of which contained blowing agent in an amount of 5.5 weight percent to at least 7 weight percent. Example 10 had blowing agent therein at a level of approximately 6 weight percent. From this analysis, the same molecular weight determinations were made. Table I (below) provides the results of the analyses for both the formulation of the present invention (Example 9) as well as several commercial formulations currently available.

As can be seen from Table I, only the formulation of the present invention had all three identifying characteristics within the scope of those which are identified as pertaining to the polymer of the present invention. Even though each of these polymers falls within the definition of the polymer utilized in the formulation of the present invention, none of these formulations had the amount of blowing agent required in the formulation of the present invention.

TABLE I

| | POLYMER CHARACTERISTICS | | | | |
|---|---|---|---|---|---|
| EXAMPLE | $M_n$ x10E5 (g/mol) | $M_w$ x10E5 (g/mol) | PD | $M_z$ x10E5 (g/mol) | $M_z$:$M_n$ |
| 8 | 1.12 | 2.02 | 1.82 | 3.00 | 2.70 |
| 9 | 1.12 | 2.17 | 1.95 | 3.35 | 2.99 |
| 10 | 0.87 | 1.93 | 2.20 | 3.11 | 3.56 |
| 11 | 1.37 | 2.89 | 2.10 | 5.28 | 3.84 |
| 12 | 1.20 | 2.51 | 2.09 | 4.58 | 3.81 |
| 13 | 1.01 | 1.89 | 1.88 | 3.07 | 3.04 |
| 14 | 1.13 | 2.20 | 1.94 | 3.83 | 3.37 |
| 15 | 1.27 | 2.73 | 2.15 | 5.03 | 3.96 |

[polydispersity was calculated as $M_w/M_n$, and the ratio of $M_z$ to $M_n$ was calculated by dividing the value obtained for Mz by the value obtained for Mn]

EXAMPLES 16-17

These two examples illustrate the difference in both (1) total emissions, as well as (2) emissions during aging, for expanded polystyrene which was produced according to the process described in Example 16 illustrates the emissions from a "conventional" process which employs a blowing agent (pentane) in an amount of 6 weight percent. Example 17 illustrates, in contrast, the emissions from a process employing a formulation which comprises only 3.5 weight percent pentane. For Example 16 the amount of blowing agent added during the polymerization was approximately 6 weight percent, whereas for Example 17 only about 3.5 weight percent blowing agent was added during the polymerization. Table II (infra) provides the results of emissions during each of the expansion steps for each Example, for each aging period for each Example, and during the molding step for each Example. The bottom row of Table II provides figures for the total emissions during the entire process of expansion, aging and molding.

As can be seen from the figures in Table II, the polystyrene having the low initial level of blowing agent (i.e. Example 17) exhibited a total emissions of only from 42 to 79 percent as much as for Example 16. Furthermore, the total emissions during aging was only from about 17 percent to about 48 percent for Example 17 as compared with Example 16. Accordingly, the formulation (and polymer) of the present invention exhibit a substantial reduction in both the total emissions as well as the emissions during aging.

TABLE II

| | Example 16 | Example 17 |
|---|---|---|
| blowing agent content | 6 wt. percent | 3.5 wt. percent |
| 1st Pass Expansion | .76 | .45 |
| 1st pass aging emissions | 2.0 | .12 |
| 1st pass aging time | 24 hours | 4 hours |
| 2nd pass Expansion | N/A | .07 |
| 2nd pass aging emissions | N/A | .22 |
| 2nd pass aging time | N/A | (2 hours) |
| molding emissions | 0.6-1.1 | 0.76% |
| Total Emissions | 3.36-3.86% | 1.62% |

EXAMPLE 18

Method of Determining and Calculating the Degree of Branching

Branching can be determined using a Viscotek differential viscometer and related software according to the theory of Zimm and Stockmayer. More extensive and descriptive discussions of this theory, as well as related subject matter, can be found in Billmeyer, F. W., Jr., *Textbook of Polymer Science*, 2nd Ed., 1971, Wiley-Interscience, N.Y., N.Y., especially pages 89-90, which is herein incorporated by reference. Using the Mark-Houwink constants for known linear samples of polystyrene, one can calculate the branching frequency of the number of branches per 100 monomer units. More extensive and descriptive discussions of these constants, as well as related subject matter, can be found in Billmeyer, F. W., Jr., *Textbook of Polymer Science*, 2nd Ed., 1971, Wiley-Interscience, N.Y., N.Y., especially pages 86-87, which are herein incorporated by reference.

We claim:

1. A polystyrene polymer exhibiting:
   (a) a polydispersity of from about 1 to less than 2.0,
   (b) a weight average molecular weight of greater than about 200,000 to about 300,000, and
   (c) an $M_z$:$M_n$ of from about 2 to less than about 3.0, wherein the polystyrene polymer is branched to from 0 to less than 5 weight percent.

2. A polystyrene polymer as described in claim 1 wherein the polymer exhibits a polydispersity of from about 1.5 to less than 2.0.

3. A polystyrene polymer as described in claim 1 wherein the polymer exhibits a polydispersity of from about 1.7 to about 1.98.

4. A polystyrene polymer as described in claim 1 wherein the polymer has a weight average molecular weight of from greater than 200,000 to about 250,000.

5. A polystyrene polymer as described in claim 1 wherein the polymer has a weight average molecular weight of from greater than 200,000 to about 220,000.

6. A polystyrene polymer as described in claim 1 wherein the polymer has an $M_z:M_n$ of from about 2.5 to less than 3.0.

7. A polystyrene polymer as described in claim 1 wherein the polymer has an $M_z:M_n$ of from about 2.7 to less than 3.0.

8. A polystyrene polymer as described in claim 1 wherein the polymer is ranched to from 0 to less than 2 weight percent.

9. A polystyrene polymer as described in claim 1 wherein the polymer is ranched to from 0 to less than 1 weight percent.

10. A polystyrene polymer as described in claim wherein the polystyrene is substantially homopolymeric polystyrene polymer.

11. A polystyrene polymer as described in claim 1 wherein the polystyrene polymer is a substantially unsubstituted polystyrene homopolymer.

12. A polystyrene polymer as described in claim wherein the polystyrene polymer is a substantially homopolymeric, unsubstituted polystyrene polymer.

13. A polystyrene polymer exhibiting:
(a) a polydispersity of from about 1.5 to less than 2.0,
(b) a weight average molecular weight of greater than about 200,000 to about 250,000, and
(c) an $M_z:M_n$ of from about 2.5 to less than about 3.0, wherein the polystyrene polymer is branched to from 0 to less than 2 weight percent, and wherein the polystyrene polymer is a substantially homopolymeric, unsubstituted polystyrene polymer.

14. A polystyrene polymer exhibiting:
(a) a polydispersity of from about 1.7 to about 1.98,
(b) a weight average molecular weight of greater than about 200,000 to about 220,000, and
(c) an $M_z:M_n$ of from about 2.7 to less than about 3.0. wherein the polystyrene polymer is branched to from 0 to less than 1 weight percent, and wherein the polystyrene polymer is a substantially homopolymeric, unsubstituted polystyrene polymer.

* * * * *